United States Patent Office 3,311,686
Patented Mar. 28, 1967

3,311,686
REFRACTORY SHAPE AND PROCESS OF
MAKING SAME
Calvin M. Christy, St. Louis, Mo., assignor to Christy Firebrick Company, St. Louis, Mo., a corporation of Missouri
No Drawing. Filed Mar. 15, 1965, Ser. No. 439,951
8 Claims. (Cl. 264—117)

This invention relates to a refractory shape and particularly to a method of manufacturing an approximately spherical refractory shape which requires no subsequent processing, apart from normal drying, after being formed.

The present product is useful as a graded support bed in catalytic processes.

One of the principal objects of the present invention is to provide a substantially spherical refractory shape in finished form without the necessity of kiln firing or the like.

Another principal object of the present invention is to provide a method of making refractory balls for catalytic beds in finished form using only air drying at room temperatures.

These and other objects and advantages will become apparent hereinafter.

The present invention comprises a spherical refractory shape containing hydraulic cement and further comprises a method of making the same without expensive kiln firing.

The present process includes the steps of feeding a prepared dry mixture into a rotating pan or drum and adding water to permit the formation of nearly spherical shapes of different sizes ranging from $\frac{1}{16}''$ to $2''$ in diameter. This process differs from the conventional pelletizing operation in that a nearly spherical shape with a smooth, uniform surface results. Proper operation of the equipment makes it possible to produce these nearly spherical shapes to any desired size within the foregoing range.

The present process results in a nearly spherical refractory shape being discharged from the rotating pan or drum which is in its finished form except for air drying. To acquire its finished shape and desired strength and other physical properties, the refractory shape does not have to be heat treated, kiln fired, or further processed.

Forming the refractory material and water into a nearly spherical shape, or ball, results from a rolling, snow balling, or agglomerating phenomenon in the tilted rotating pan or drum assisted to some extent by the capillary action of and surface tension of water on the dry particles of the dry mixture in contact with the feed water. Included as an essential ingredient in the present dry mixture is a hydraulic setting agent which serves as a binder and results in imparting to the finished shape during the drying period the physical properties required. Without the use of a hydraulic setting agent, the finished product would not have the desired physical properties. Such properties could only be obtained, if obtainable at all, by the development of a ceramic bond or other type of bond by kiln firing or heat treatment. The hydraulic setting agent begins to take on the hydraulic set during the residence time of the balls in the rotating pan or drum.

Any of the several types of hydraulic setting agents, or cements, commercially available can be used. The hydraulic setting agents are essentially calcium silicate and calcium aluminate materials produced from natural or synthetic materials. These hydraulic setting agents may be used in the dry mixture within the range of 10% to 30% by weight. We find that approximately 20% plus or minus 2% gives best results.

Clean fresh water is used to provide a moisture content of approximately 5–15%, preferably 10% by weight. The water serves the purpose of providing moisture necessary to form the nearly spherical shapes and to permit the hydraulic set to take place. Surplus water is removed by air drying. The water may be introduced by atomized spray, cone or fan shaped sprays or by small streams. Approximately equal results are obtained with water temperature in the range of 33° F. to 90° F.

The dry mixture, in addition to the hydraulic setting agent, consists of any desired non-plastic aggregate in the amount of approximately 80% by weight, having a range of 70% to 90%. This aggregate may be calcined clay, crushed firebrick, mullite, sillimini'e, calcined alumina, tabular alumina, fused alumina, silicon carbide or any other desired aggregate material that will impart to the finished product desired physical and refractory properties. 2% to 15% of this aggregate may be plastic clay to serve as a plasticizer or plastic binder to assist in shape formation, surface texture, and to strengthen the finished body. The resulting finished shape results in a uniform, homogeneous ceramic body, generally without evidence of a "seed" or inner core. This is an important feature of this process because it reduces or eliminates any tendency towards lamination with resultant shelling or peeling. This uniform texture also contributes to the complete absence of any tendency to crack, break, shell or crumble when subjected to severe thermal shock. About 1% to 2% (preferably 1%), based on the dry ingredients, of finely divided plastic clay may be used.

The particle sizing of the aggregate is important from the standpoint of obtaining a uniform body, obtaining a finished shape having a minimum of surface dusting (or chalkiness) and, most important, obtaining in the finished shape as discharged from the pan or drum a sufficiently smooth and clean surface such as to eliminate the requirement of further processing.

Many different particle sizings have been tried and it has been found that a balance of coarse and fine particles gives satisfactory results. It has been found that when the aggregate is too fine, a chalky surface can result; when the aggregate is too coarse, a rough, gritty surface texture occurs. Both conditions are undersirable.

The size of the balls can be controlled by the angle of inclination of the pan, its rate of rotation, type of feed, and position of introducing the feed and water into the rotating pan or drum. For example, in a 6 ft. diameter pan a rate of rotation of 12 r.p.m. results in the formation of $\frac{1}{2}''$ and smaller balls, whereas a rate of 8 to 9 r.p.m. is desirable to produce balls larger than $\frac{1}{2}''$. A speed of rotation of about 7–14 r.p.m. is suitable.

Following are specific examples of the present invention.

EXAMPLE 1

200# 20 mesh and finer calcined clay, 200# 70 mesh and finer calcined clay, 5# finely divided —200 mesh plastic clay, and #100 calcium aluminate cement are mixed dry and fed into a rotating pan which is positioned at an angle of 36–42° from horizontal and rotating at 12 revolutions per minute (r.p.m.). Simultaneously with the addition of dry ingredients, water is sprayed into the pan. 50.5# of water is used. With the pan rotating in a clockwise direction, the dry ingredients are deposited at approximately the 6 o'clock position and the water thereafter sprayed in at approximately the 9 o'clock position. The pan is rotated for 20–25 minutes and discharges approximately 98% $\frac{1}{4}''$ balls. The balls are passed through a sorting line and over a screen, where the undersized particles drop out. Normally the finished balls are allowed to cure and dry for a period of 6 to 9 days, but they can be packaged and shipped from the sorting line.

It is emphasized that there is no kiln firing necessary to form the refractory shape into its finished form.

When the products of Example 1 (after 6 to 9 days of air drying at about 70° F.) are tested for strength, etc., the following tests are used and the indicated results obtained.

A. Crush test—the balls are placed between steel plates in a hydraulic press and have a "crushing stress" of 1000–1500 p.s.i. based on the area at the diameter.

B. Absorption test—the balls are boiled in water for two hours and absorb from 2–4% water. This is a standard A.S.T.M. test procedure.

C. Heat test—the balls are heated to 1250° F. and immediately dropped into cold water at about 40° F. No shattering, cracking or spalling occurs.

D. Drop test—the balls are dropped onto a steel plate from a height of 15 feet. None shatter or crack.

E. Surface attrition test—the balls are tumbled in a ball mill for twenty-nine hours. Less than 4% dust is evolved.

EXAMPLE 2

The same formulation and method addition to the rotating pan is employed as in Example 1, but the pan is inclined initially at an angle of 36° and rotated at 8½ r.p.m. until the addition of water and dry ingredients is complete. The pan is then inclined at an angle of 32° with the horizontal and rotated at 8½ r.p.m. Balls of approximately 1" in diameter are discharged from the pan and air dried as in Example 1. The refractory shapes give the same test results as those of Example 1.

EXAMPLE 3

400# of 48 mesh and finer calcined clay is mixed with 5# finely divided −200 mesh plastic clay and 100# calcium aluminate cement. The dry ingredients are mixed in a rotating pan with 50.5# water in a procedure similar to that of Example 1 to produce ¾" balls.

EXAMPLE 4

400# of 35 mesh and finer calcined clay is mixed with 5# finely divided −200 mesh plastic clay and 100# calcium aluminate cement and 50.5# water in a procedure similar to that of Example 2 to produce 1" balls.

Thus it is seen that by using a rotating pan or drum in combination with a specific feed mixture incorporating a hydraulic setting cement that I can produce in a single operation a nearly spherical refractory shape of controlled size with a homogeneous body and relatively smooth surface texture. This results in a rapid and inexpensive method of producing a finished product otherwise quite difficult to form.

The foregoing examples can be carried out either in batch type operations or continued processes.

This invention is intended to cover all changes and modifications of the examples of the invention herein chosen for purposes of the disclosure which do not constitute departures from the spirit and scope of the invention.

What I claim is:

1. A method of making a substantially spherical refractory shape comprising the steps of spraying about 5–15% water by weight into a rolling mixture of about 70–90% non-plastic refractory aggregate and about 10–30% hydraulic setting agent, said water being by weight of the aggregate and setting agent, rolling the wetted mixture while simultaneously adding additional dry ingredients and water in the said proportion until spherical refractory shapes of a substantially predetermined diameter from about ⅛" to about 2" in diameter are formed, discharging the shapes, and air drying the shapes to produce finished refractory products.

2. The process of claim 1 wherein the aggregate is about a 50–50 mixture of 20 mesh and finer and 70 mesh and finer.

3. The process of claim 1 wherein the aggregate is 48 mesh and finer.

4. The process of claim 1 wherein the setting agent is calcium aluminate cement.

5. The process of claim 1 wherein the aggregate and setting agent and water are rolled about an axis of rotation at a speed of about 7–14 turns per minute at an angle of about 32–42° from horizontal while being rolled into spherical shapes.

6. The process of claim 1 wherein the mixture includes about 1% to about 2% finely divided plastic clay of −200 mesh.

7. The process of claim 1 wherein the aggregate is 35 mesh and finer.

8. The process of claim 2 wherein the aggregate is calcined flint fine clay.

References Cited by the Examiner

UNITED STATES PATENTS

| | | | |
|---|---|---|---|
| 2,630,616 | 3/1953 | Robinson | 264—15 |
| 2,874,071 | 2/1959 | Kadisch et al. | 106—64 |
| 2,912,341 | 11/1959 | Ricker | 106—64 |

TOBIAS E. LEVOW, *Primary Examiner.*

J. E. POER, *Assistant Examiner.*